United States Patent
Satzoda et al.

(10) Patent No.: US 10,417,506 B2
(45) Date of Patent: Sep. 17, 2019

(54) EMBEDDED SURROUND VISION-BASED DRIVER ASSISTANCE FOR SAFE ZONE ESTIMATION

(71) Applicant: The Regents Of The University Of California, Oakland, CA (US)

(72) Inventors: Ravi Kumar Satzoda, San Diego, CA (US); Mohan M. Trivedi, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 14 days.

(21) Appl. No.: 15/356,495

(22) Filed: Nov. 18, 2016

(65) Prior Publication Data

US 2017/0147891 A1 May 25, 2017

Related U.S. Application Data

(60) Provisional application No. 62/257,649, filed on Nov. 19, 2015.

(51) Int. Cl.
*H04N 7/18* (2006.01)
*G06K 9/00* (2006.01)
*G06K 9/20* (2006.01)
*B60W 30/00* (2006.01)

(52) U.S. Cl.
CPC ......... *G06K 9/00805* (2013.01); *B60W 30/00* (2013.01); *G06K 9/00798* (2013.01); *G06K 9/2054* (2013.01); *H04N 7/181* (2013.01); *G06K 2209/23* (2013.01)

(58) Field of Classification Search
None
See application file for complete search history.

(56) References Cited

U.S. PATENT DOCUMENTS 9,643,605 B2 * 5/2017 Pawlicki ................. B60T 7/22
9,858,639 B2 * 1/2018 Zhang .................. G06T 3/0062
(Continued)

OTHER PUBLICATIONS

Khairdoost, "Front and Rear Vehicle Detection Using Hypothesis Generation and Verification," Signal & Image Processing : An International Journal (SIPIJ) vol. 4, No. 4, Aug. 2013.*

(Continued)

*Primary Examiner* — Jayanti K Patel
*Assistant Examiner* — Shadan E Haghani
(74) *Attorney, Agent, or Firm* — Mintz Levin Cohn Ferris Glovsky and Popeo, P.C.

(57) ABSTRACT

A driver assistance system including at least a first camera. The first camera can be configured to obtain image data of a region external to the host vehicle. Lane detection analysis can be performed on the image data to identify a region of interest in the image data. The region of interest can be divided into portions. Each portion can be analyzed to determine whether it includes the characteristics of an under-vehicle region. When an under-vehicle region is detected a portion of the image adjacent an under-vehicle region can be analyzed to determine whether it includes an image of another vehicle. A distance between the another vehicle and the host vehicle can be determined using the image data. A threat analysis can be performed to provide a level of threat posed by the another vehicle to the host vehicle.

20 Claims, 8 Drawing Sheets

(56) References Cited

U.S. PATENT DOCUMENTS

| | | | |
|---|---|---|---|
| 2015/0249807 A1* | 9/2015 | Naylor | H04N 7/18 |
| | | | 348/155 |
| 2015/0344033 A1* | 12/2015 | Fukuda | B60W 30/16 |
| | | | 701/117 |
| 2016/0001780 A1* | 1/2016 | Lee | G06K 9/00791 |
| | | | 701/48 |
| 2017/0001636 A1* | 1/2017 | Laur | B60W 30/09 |

OTHER PUBLICATIONS

Satzoda, R. K., and Mohan M. Trivedi. "Selective salient feature based lane analysis." Intelligent Transportation Systems—(ITSC), 2013 16th International IEEE Conference on. IEEE, 2013.

Satzoda, Ravi Kumar, Pujitha Gunaratne, and Mohan M. Trivedi. "Drive quality analysis of lane change maneuvers for naturalistic driving studies." Intelligent Vehicles Symposium (IV), 2015 IEEE. IEEE, 2015.

Sivaraman, Sayanan, and Mohan M. Trivedi. "Active learning for on-road vehicle detection: A comparative study." Machine vision and applications (2014): 1-13.

\* cited by examiner

EMBEDDED SURROUND VISION-BASED DRIVER ASSISTANCE FOR SAFE ZONE ESTIMATION

CROSS-REFERENCE TO RELATED APPLICATIONS

This application claims priority to and the benefit of U.S. Provisional Patent Application No. 62/257,649 which is entitled "EMBEDDED SURROUND VISION-BASED DRIVER ASSISTANCE FOR SAFE ZONE ESTIMATION," and filed on Nov. 19, 2016, the disclosure of which is incorporated herein by reference for all purposes.

FIELD

The subject matter described herein relates generally to machine vision.

BACKGROUND

Autonomous threat detection for vehicles relies on image data which is processor-intensive to analyze. When travelling at speed, images captured at many frames per second are required to be obtained to have sufficient information for a driver assistance system to make decisions. Having a format that requires high processing capabilities, such as image data, coupled with a high frequency of obtaining data requires high processing capabilities.

SUMMARY

The subject matter described herein provides a driver assistance system configured to operate on embedded processors, such as central processing units. The disclosed system may include for example a two-camera setup to estimate a possible threat to a vehicle caused by other vehicles in front and to the rear of the vehicle. In addition to driver assistance operations of lane departure warning and collision avoidance, the disclosed system may assist the driver with safe driving zones that are updated by analyzing the dynamics of other vehicles from front and rear of the vehicle carrying the two-camera system.

In one aspect a system is provided that contains a first device and a second device. The first device and the second device can form a driver assistance system. The first device can include at least one first camera configured to at least obtain image data of a region external to the host vehicle. The second device can include at least one second camera configured to at least obtain image data of another region external to the host vehicle. At least one processor can be embedded in the first device and/or the second device. At least one memory can be integrated into the first device and/or second device. The at least one memory can be configured to at least store computer-readable instructions, which, when processed by the at least one processor, can be configured to cause the at least one processor to perform one or more operations.

The one or more operations can include receiving, from the at least one first camera, image data of a region external to the host vehicle. A location of a lane in which the host vehicle is travelling can be determined. The location can be in an image domain of the image data. A first portion of the image data can be analyzed. The first portion of the image data can be located within the lane in which the host vehicle is travelling. The analyzing of the first portion can determine whether the first portion of the image data contains an image of an under-vehicle region. In some variations, an under-vehicle region can be determined by analyzing the grey color under the vehicle to distinguish between a grey color of the road and a grey color of a shadow on the road caused by another vehicle. Analyzing the first portion of the image data to determine whether the first portion of the image data contains the image of the under-vehicle region can include, at least, applying a probabilistic distribution curve providing an indication of a likelihood that the first portion of the image data contains the image of the under-vehicle region.

In some variations, analyzing the first portion of the image data can include generating, in the image domain of the image data, a region of interest. The region of interest can be disposed within the lane in which the host vehicle is travelling. The region of interest can be divided into a set of discrete blocks. The set of discrete blocks can be analyzed to determine whether a block of the set of discrete blocks contains the image of the under-vehicle region.

A second region of interest can be generated. The second region of interest can be associated with a lane adjacent to the lane in which the host vehicle is travelling. The second region of interest can be generated based on a lane offset value and calibration information associated with first camera. A third region of interest can be generated in a similar manner to the second region of interest. The third region of interest can be located opposite the second region of interest and adjacent to the first region of interest.

In response to determining that the first portion of the image data contains the image of the under-vehicle region, a second portion of the image data can be analyzed to determine whether the second portion of the image data contains an image of another vehicle. The second portion of the image data can be adjacent to the first portion of the image data. In some variations, the second portion of the image data can be above the first portion of the image data. Analyzing the second portion of the image data can include, at least, bounding, in response to determining that the block of the set of discrete blocks contains the image of the under-vehicle region, a portion of the image data adjacent to the block of the set of discrete blocks. The bounded portion of the image data can be analyzed to determine whether the bounded portion of the image data contains the image of the another vehicle.

In response to determining that the second portion of the image data contains the image of another vehicle, a threat posed by the another vehicle to the host vehicle can be determined. The determining of the threat posed by the another vehicle to the host vehicle can include determining, based on a location in the image domain of the image data of the bounded portion of the image data, a distance between the host vehicle and the another vehicle. In some variations, the determining of the threat posed by the another vehicle to the host vehicle, can include receiving motion information associated with the host vehicle. A motion of the another vehicle relative to the host vehicle can be determined based on the motion information associated with the host vehicle.

In some variations, an alert can be generated to be provided to a driver of the host vehicle in response to the determining that the threat posed by the another vehicle is above a threshold threat value.

In one or more other aspects, a method is provided that comprises one or more of the operations described herein, a non-transitory computer readable medium is provided that can be configured to cause at least one processor to perform one or more of the operations described herein, and the like.

The details of one or more variations of the subject matter described herein are set forth in the accompanying drawings and the description below. Other features and advantages of the subject matter described herein will be apparent from the description and drawings, and from the claims.

DETAILED DESCRIPTION

Advanced driver assistance systems typically rely on visual data of areas surrounding a vehicle to determine threats to the vehicle. Threats are typically other vehicles in the vicinity of the host vehicle, but may also be objects in the road, people in the road, turns in the road, or the like. In order to use visual data for threat analysis, the visual data must be parsed and analyzed for such threats. This is computationally expensive. Due to the speed at which vehicles travel, reducing the frame rate at which visual data is analyzed can allow large distances to be travelled by a vehicle before detecting a threat. The presently described subject matter detects threats to a host vehicle with reduced computational resources.

The presently described subject matter includes a driver assistance system configured to operate using embedded central processing units, or processor, within one or more devices of the driver assistance system. As described in further detail below, the driver assistance system can be configured to generate a region(s) of interest within image data obtained by a camera of the driver assistance system. The region(s) of interest can be analyzed to detect the possible existence of a vehicle in the region(s) of interest using relatively low processor-resource techniques. Following a determination that there likely is a vehicle in a region(s) of interest, a portion of the region(s) of interest can be analyzed to verify the existence of a vehicle using relatively high-processor-resource techniques.

Figure 1:
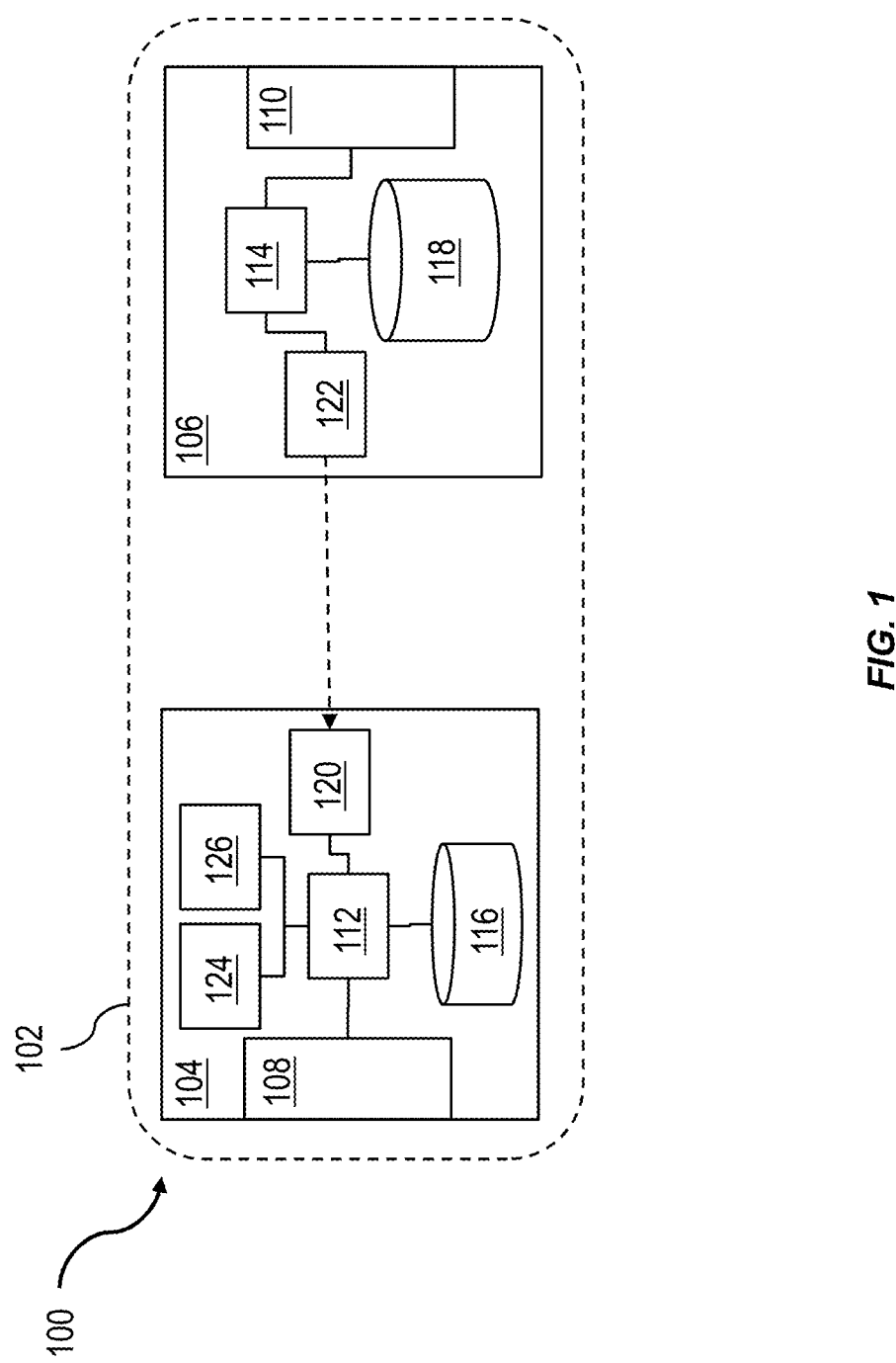
FIG. 1 is an illustration of a driver assistance system having one or more features consistent with the present description.

FIG. 1 is an illustration of a driver assistance system 100 having one or more features consistent with the present description. The driver assistance system 100 can be disposed within a vehicle 102. In some variations, the driver assistance system 100 can include a forward-facing device 104 and a rearward-facing device 106. The forward-facing device 104 and the rearward-facing device 106 can each include a camera 108, 110, respectively.

Figure 2:
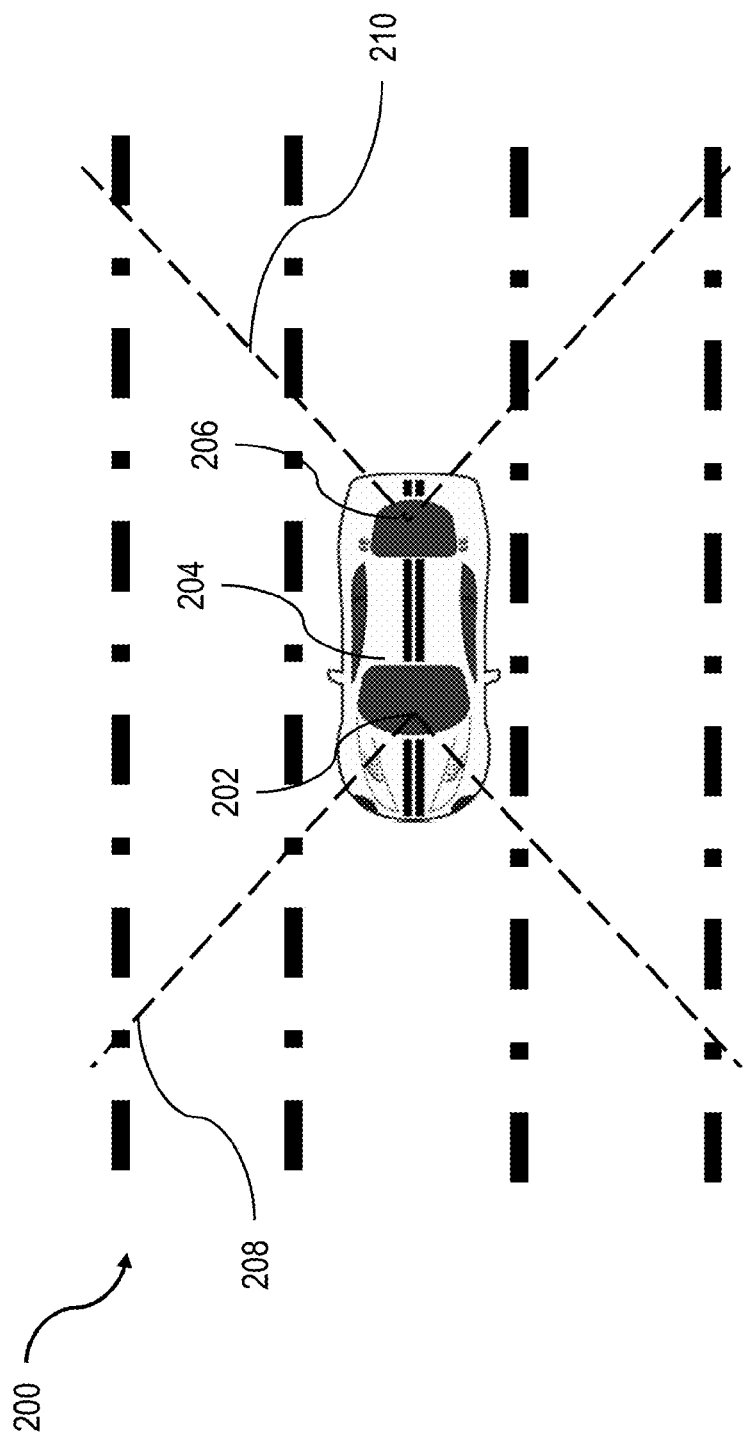
FIG. 2 is an illustration of a driver assistance system having one or more features consistent with the present description.

FIG. 2 is an illustration of a driver assistance system 100 having one or more features consistent with the present description. Referring to both FIG. 1 and FIG. 2, the forward-facing device 104 can be disposed at a forward position 202 of a vehicle 204 and the rearward-device device 106 can be disposed at a rearward position 206 of the vehicle 204. The camera 108 of the forward-facing device 104 can be configured to obtain image data of an area 208 in front of the vehicle 204. The camera 110 of the rear-ward facing device 106 can be configured to obtain image data of an area 210 behind the vehicle 204.

The forward-facing device 104 and the rearward-facing device 106 can each include a processor(s) 112 and 114, respectively. The processor(s) 112 and 114 can be embedded into each of the devices. In some variations, the processor(s) 112 and 114 can be configured to perform the specific tasks of the forward-facing device 104 and the rearward-facing device 106, respectively. The forward-facing device 104 and the rearward-facing device 108 can each include a memory 116 and 118, respectively. The memory 116 and 118 can be configured to store computer-readable instructions. The computer-readable instructions can be executed by the processor(s) 112 and 114 to perform one or more operations consistent with the functions of the forward-facing device 104 and the rearward-facing device 108, respectively.

Image data obtained by the cameras 108 and 110 can be processed separately. The image data obtained by the camera 108 of the forward-facing device 104 can be processed by the processor(s) 112 of the forward-facing device 104. The image data obtained by the camera 110 of the rearward-facing device 106 can be processed by the processor(s) 114 of the rearward-facing device 104. One example of the processor(s) 112 and 114 can include the Snapdragon 810 processor (commonly available from Qualcomm®), which can be paired with a DragonBoard by Qualcomm®, although other types of boards and processors can be used as well.

In some variations, communication between the rearward-facing device 106 and the forward-facing device 104 can be wireless communication. For example, the forward-facing device 104 can include a transceiver 120. The rearward-facing device 106 can include a transceiver 122. The transceiver 122 can be configured to transmit information from the rearward-facing device 106 to the forward-facing device 104. Each device may include a communication device. The communication devices of the driver assistance system 100 can be configured to transmit data between each other. In some variations, the communication device may be a wired communication device providing communications via a wire, but, or the like, between the forward-facing device 104 and the rearward-facing device 106. The wire may be configured to transmit data between the rearward-facing device 106 and the forward-facing device 104.

In some variations, the rearward-facing device 106 of the driver assistance system 100 can be configured to perform the image data analysis and threat detection on the image data obtained by the camera 11 and send the results to the forward-facing device 104. The results from the rearward-facing device 106 can be referred to as semantic information.

The transceivers 120 and 122 can be configured to transmit data wirelessly using one or more wireless protocols. For example, the transceivers 120 and 122 can be configured to transmit data using Bluetooth®, WiFi, IEEE 802.15.4-2006, ZigBee, 6LoWPAN, UWB, Wireless USB, sub-GHz, or the like.

In the driver assistance system 100, the forward-facing device 104 can be the host device and the rearward-facing device 106 can be the client device. The processor(s) 112 of the forward-facing device 104 can be referred to as the host processor(s) 112. The processor(s) 114 of the rearward-facing device 106 can be referred to as the client processor(s) 114. The host processor(s) 112 can be configured to determine a threat to the host vehicle based on the information from both the forward-facing device 106 and the rearward-facing device 108.

In some variations, the memory 116 and 118 can include one or more vision algorithms configured to facilitate analysis of the image data obtained by the cameras 108 and 110. The vision algorithms can be configured to operate efficiently on the processor(s) 112 and 114 that are embedded in the forward-facing device 104 and the rearward-facing device 106, respectively.

Figure 3:
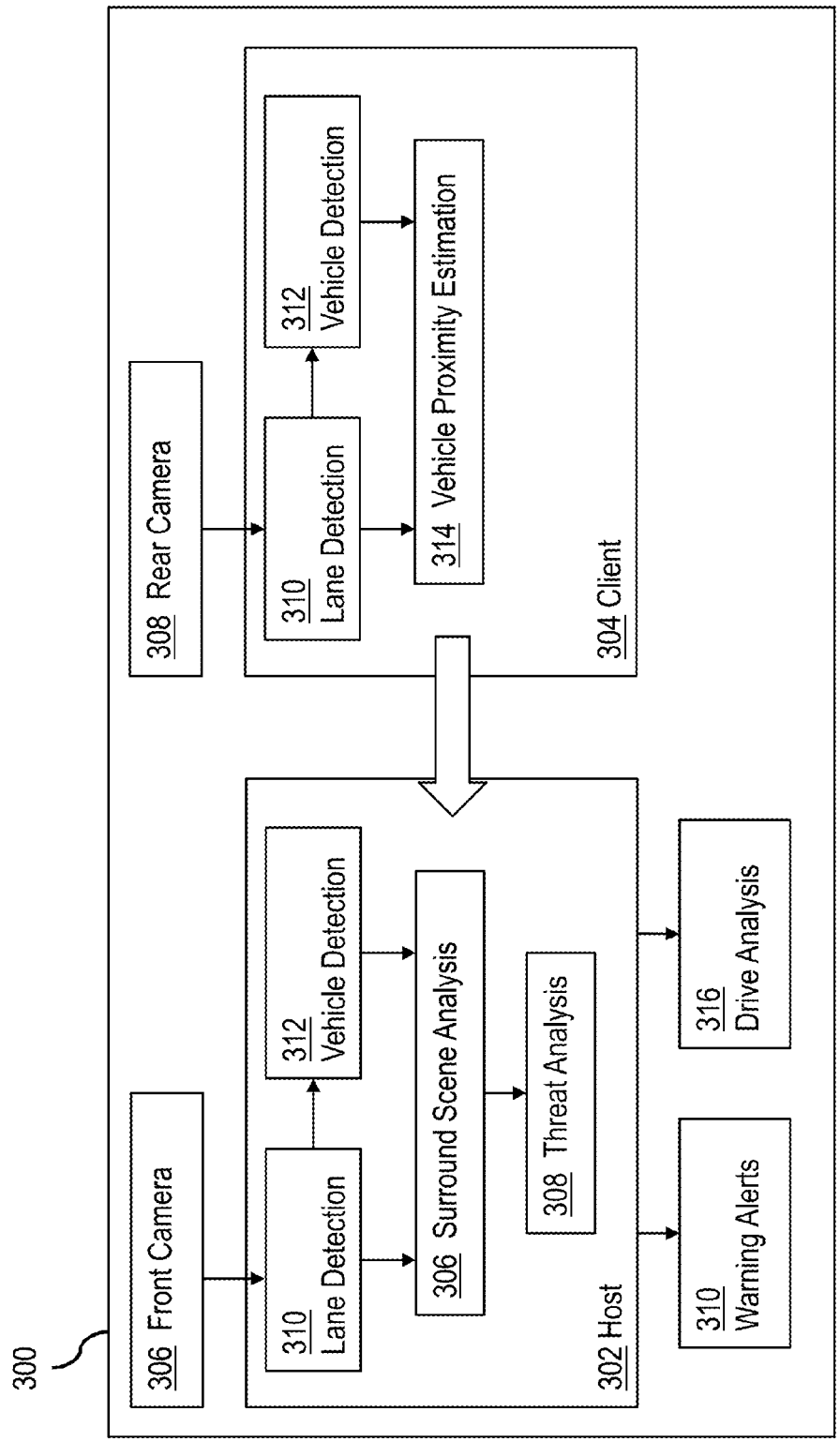
FIG. 3 is an illustration of the computational engines for a host processor and a client processor, the computational engines having one or more features consistent with the present description.

FIG. 3 is an illustration of the computational engines for a host processor 302 and a client processor 304, the computational engines having one or more features consistent with the present description. Image data from a forward-facing camera 306 can be received at the host processor 302. Image data from a rearward-facing camera 308 can be received at the client processor 304. The host processor 302 and the client processor 304 can both perform lane detection analysis 310. Lane detection analysis 310 can be followed by vehicle detection analysis 312. Each of the host processor 302 and the client processor 304 can independently perform lane detection analysis 310 and vehicle detection analysis 312 on the image data received from their respective cameras.

The client processor 304 can be configured to perform vehicle proximity estimation 314. The vehicle proximity estimation 314 can be based on the lane detection analysis 310 and the vehicle detection analysis 312. The vehicle positions determined by the vehicle detection analysis 312 performed by the client processor 304 can be transmitted to the host processor 302. The host processor 302 can be configured to perform threat analysis based on the vehicle positions transmitted to the host processor 302 from the client processor 304. These operations can be configured to be performed efficiently by a driver assistance system, such as driver assistance system 100 illustrated in FIG. 1. The host processor(s) 112 can be configured to do the same image analysis as the client processor(s) 114 on the image data obtained by the camera 108.

It has been observed that vehicle detection in image data can be the most time intensive operation performed when performing threat analysis based on the image data obtained by a camera, such as camera 306 or camera 308, as illustrated in FIG. 3. For example, when the processor, such as host processor 302 or client processor 304 that performs the vehicle detection analysis, is a Snapdragon 810 central processing unit, performance of image data determination causes a reduction in the frame rate to less than 4 frames per second. When operating a vehicle and performing threat analysis, real-time or near-real-time operation is important to avoid significant distances from being travelled without analysis of road conditions.

In some variations, threat analysis can be limited to analyzing the closest vehicles to the host vehicle. This is due to an assumption that the closest vehicles pose the most immediate threat. The host vehicle can sometimes be referred to as the ego-vehicle and the lane in which the host vehicle is travelling in can sometimes be referred to as the ego-lane.

Figure 4B:
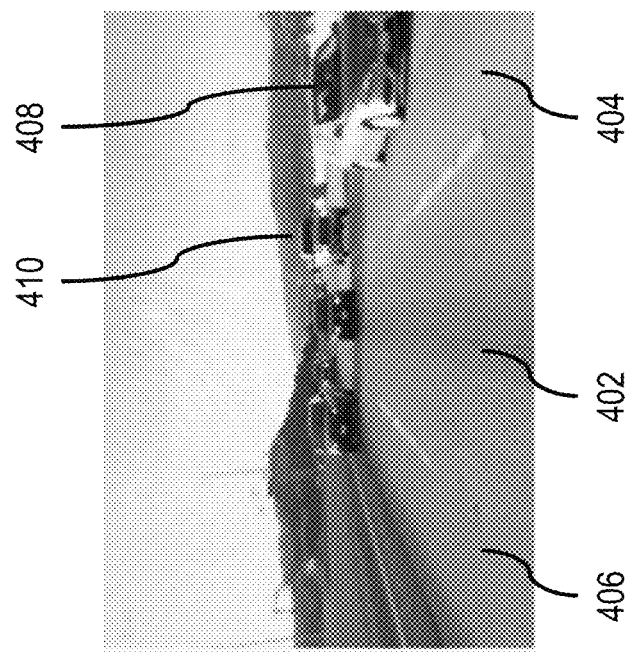
FIG. 4B illustrates image data obtained from a rearward-facing camera of a rearward-facing device of a driver assistance system having one or more features consistent with the present description.
Figure 4A:
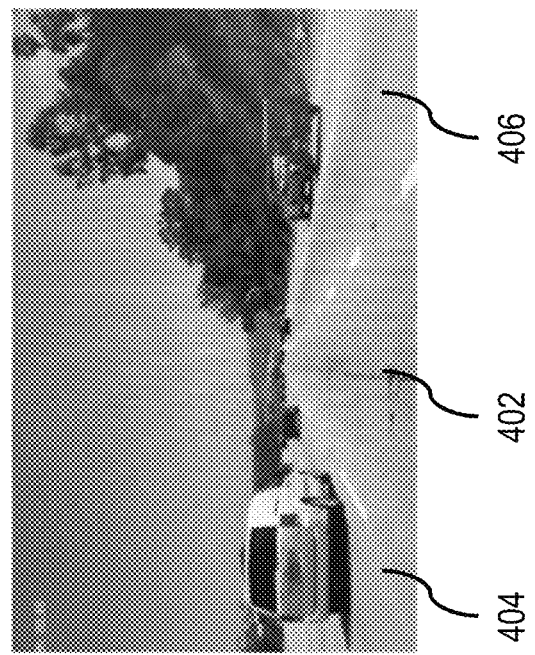
FIG. 4A illustrates image data obtained from a forward-facing camera of a forward-facing device of a driver assistance system having one or more features consistent with the present description.

FIG. 4A illustrates image data obtained from a forward-facing camera of a forward-facing device of a driver assistance system having one or more features consistent with the present description. FIG. 4B illustrates image data obtained from a rearward-facing camera of a rearward-facing device of a driver assistance system having one or more features consistent with the present description.

In some variations, a driver assistance system, such as driver assistance system 100 can be configured to identify threats to an ego-vehicle in three threat regions, or regions of interest. The three regions of interest can include the ego-lane 402, the adjacent left lane 404, and adjacent right lane 406. If there are two vehicles in a particular lane, the driver assistance system can be configured to treat the vehicle that is nearest to the ego-vehicle as the vehicle that poses the highest threat to the ego-vehicle in that region of interest. For example, in FIG. 4B there is a first vehicle 408 and a second vehicle 410 in lane 404. The driver assistance system will treat the first vehicle 408 as being a likely threat because it is the closest vehicle in that lane to the ego-vehicle an ignore the second vehicle 410. The assumption being, that the closest vehicle is more likely to hit the ego-vehicle compared to a further away vehicle in the same lane because the further away vehicle will have to collide with the nearer vehicle to become a threat to the host vehicle.

A driver assistance system, such as driver assistance system 100 illustrated in FIG. 1, can be configured to determine the regions of interest from the image data obtained by cameras of one or more devices of the driver assistance system. Determining the regions of interest can begin with lane detection.

The driver assistance system can be configured to use lane detection techniques to determine the location and/or boundaries of the ego-lane, the lane in which the ego-vehicle is travelling in. One such technique can include lane analysis using selective regions (LASeR) to detect the location and/or boundaries of the ego-lane. This can be used to determine the first region of interest which is associated with the ego-lane.

The driver assistance system can be configured to use calibration information for the camera(s) of the forward-facing device and the rearward-facing device of the driver assistance system to determine the locations of the other regions of interest. The location of the lanes adjacent to the ego-lane, and therefore associated with the other regions of interest, can be determined based on the calibration information for the camera(s) and the location of the ego-lane as determined by the one or more lane detection techniques.

In some variations, the location of the lanes adjacent to the ego-lane can be determined by generating a lane location look-up table. The lane location look-up table can be configured to store the values of an offset value that must be added to or subtracted from the ego-lane values as determined using the lane detection techniques. The offset value can be correlated with the calibration information of the camera. Correlating the offset value with the calibration information of the camera allows for the offset value to be applied in an image domain to provide the location of the regions of interest associated with the lanes adjacent to the ego-lane.

The lane location look-up table can be generated using an inverse perspective mapping operation that involves and an inverse mapping operation on image data in the image domain. The image domain being the frame of reference defined by the image data as opposed to the frame of reference defined by the real world. The lane location look-up table can be generated off-line. The lane location look-up table can be stored in memory on a device(s) of a driver assistance system. For example, referring to FIG. 1, the lane location look-up table can be stored in memory 116 and 118 of the forward-facing device 104 and the rearward-facing device 106, respectively. The lane location look-up table can be accessed by an embedded processor 112 of the device 104 that obtained the image data from the camera 108. The embedded processor 112 can be configured to determine the location of the regions of interest, adjacent to the region of interest associated with the ego-lane, using the lane location look-up table and the camera calibration information associated with the camera 108. The embedded processor 114 in the rearward-facing device 106 can be configured to perform a similar task. Using a lane location look-up table to determine the location in the image domain of the regions of interest adjacent to the ego-lane uses less processing resources compared to using image analysis algorithms to determine the location of lanes that are adjacent the ego-lane.

The driving assistance system 100 can be configured to generate vehicle hypothesis regions. The vehicle hypothesis regions can be regions in the image data that have a likelihood of including a vehicle. The vehicle hypothesis regions can be a subset of the regions of interest. Performing image analysis algorithms on the vehicle hypothesis regions, which are a subset of the regions of interest, uses less processing resources than performing image analysis algorithms on the whole region of interest.

Figure 5A:
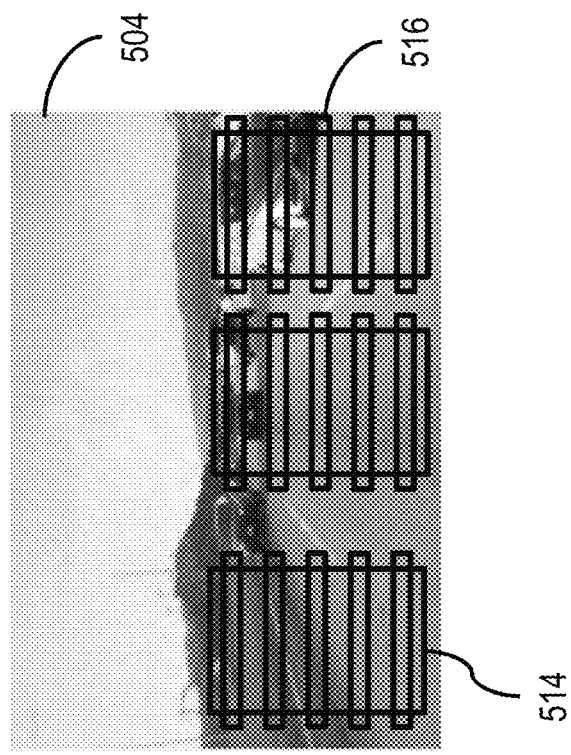
FIG. 5A illustrates image data obtained by a forward-facing camera of a forward-facing device of a driver assistance system having one or more features consistent with the present description.
Figure 5B:
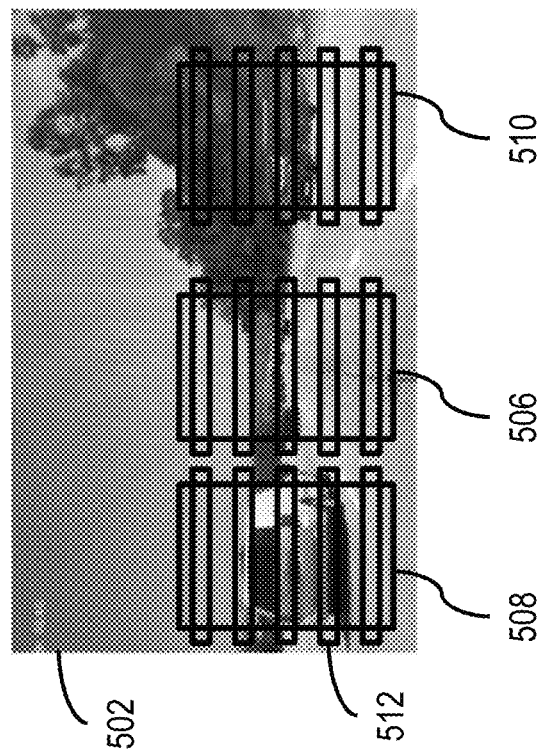
FIG. 5B illustrates image data obtained by a rearward-facing camera of a rearward-facing device of a driver assistance system having one or more features consistent with the present description.

FIG. 5A illustrates image data 502 obtained by a forward-facing camera 108 of a forward-facing device 102 of a driver assistance system 100 having one or more features consistent with the present description. FIG. 5B illustrates image data 504 obtained by a rearward-facing camera 110 of a rearward-facing device 104 of a driver assistance system 100 having one or more features consistent with the present description.

The processor 112 of the forward-facing device 102 can be configured to generate a region of interest 506 of using lane detection operations. Using a lane location look-up table, the processor 112 of the forward-facing device 102 can be configured to generate other regions of interest 508 and 510 associated with the left and right lanes, respectively. Each of the regions of interest can be divided into discrete bands 512. In some variations, a region of interest can be divided into a continuous set of bands where each band at least touches adjacent bands. In other variations, a region of interest can be divided into bands where each band does not touch an adjacent band, as shown in FIGS. 5A and 5B. FIG. 5B similarly has regions of interest 514 divided into discrete bands 51

The driving assistance system 100 can be configured to detect under-vehicle region detection. Each band of the region of interest can be analyzed for the presence of the type of shadow found underneath vehicles when travelling on a road. The probability distribution for under-vehicle region grey levels compared with road surface grey levels can be used to determine whether a great level in a particular band of a region of interest is likely to be under-vehicle region or road surface. Probability distribution curves for under-vehicle region gray levels as compared to road surface gray levels can be determined based on machine learning from many thousands of samples of image data.

The driver assistance system 100 can be configured to analyze each band, starting with the band of the region of interest that is closest to the ego-vehicle. This sequence of analysis can detect the first vehicle within a region of interest and avoid further analysis of the region of interest, thereby reducing the processing resources necessary to perform threat analysis of the image data obtained by the driver assistance system 100.

When the driver assistance system 100 determines that a band, such as band 512 illustrated in FIG. 5A, likely contains an under-vehicle region, that band can be further analyzed to verify that a vehicle is associated with the likely under-vehicle region. In some variations, this further analysis can be performed using cascade classifiers.

In response to the driver assistance system 100 determining that a band of a region of interest, for example, band 512 of region of interest 508 illustrated in FIG. 5A, likely has under-vehicle region in it, a bounding box can be drawn above the detected shadow.

Figure 6:
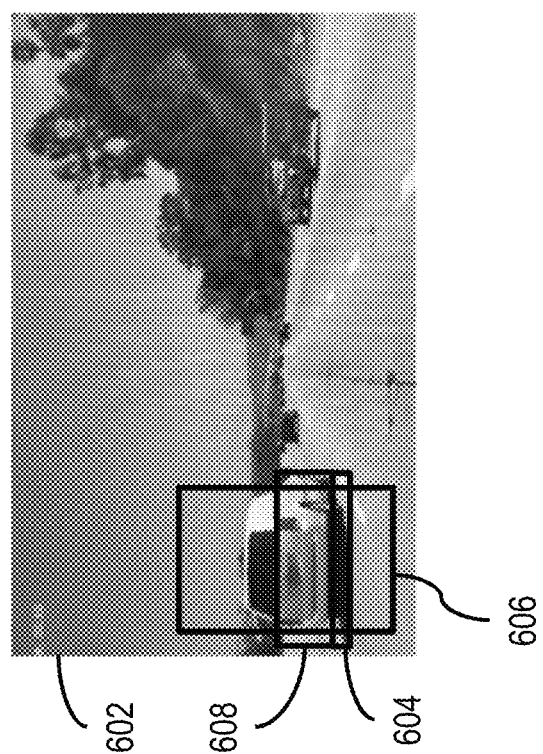
FIG. 6 illustrates image data obtained by a driver assistance system having one or more features consistent with the present description.

FIG. 6 illustrates image data 602 obtained by a driver assistance system 100 having one or more features consistent with the present description. The driver assistance system 100 may have determined that a band 604 of a region of interest 606 likely contains under-vehicle region. In response to the determination that the band 604 likely contains under-vehicle region, a bounding box 608 can be determined for a region of the image data that is above the band 604. The size of the box 608 can be proportional to the width of the region of interest at that particular y coordinate (vertical axis). The bounding box 608 can be configured to enable a determination of a fixed number of scales that the cascade classifier should be applied on. This can restrict the complex image processing resources to be expended on only the image data within the bounding box 608. For example, a Haar-Adaboost cascade classifier can be applied to the image data within the bounding box 608. In some variations, the Haar-Adaboost cascade classifier can be trained using active learning methodologies. Although the Haar-Adaboost cascade classifier is describe in this example, other types of classifiers an machine learning technologies can be used as well.

The complex image processing algorithms, such as a Haar-Adaboost cascade classifier, can be used to determine whether a vehicle exists in the region of interest. In response to a determination that a vehicle has not been detected within the bounding box 608, the process can be repeated with another band of the region of interest 606.

The operations described herein can be performed for all regions of interest to detect the presence of vehicles in the regions of interest. Referring to FIG. 1, the forward-facing device 104 can be configured to perform the operations described herein on image data obtained by the forward-facing camera 108 and the rearward-facing device 106 can be configured to perform the operations described herein on the image data obtained by the rearward-facing camera 110.

The location of the vehicles detected in the bounding boxes can be determined based on the position of the bounding boxes within the image domain. Camera calibration information can be used to extrapolate the relative positions of the vehicles with respect to the ego-vehicle. In some variations, the lower edge of a bounding box, such as bounding box 608 of FIG. 6, may be used to determine the position of the vehicle in the inverse perspective domain using the inverse perspective mapping transformation from camera calibration information. The coordinate of the bounding box in the inverse perspective mapping domain can be scaled based on the camera calibration information to determine the distance of the vehicle from the ego-vehicle.

When the distance of the vehicles in each region of interest is determined a threat analysis can be performed by the driver assistance system 100. In some variations, threat analysis can be performed using the longitudinal distances of the surrounding vehicles for the ego-vehicle. The closer the vehicle to the ego-vehicle the greater the threat to the ego-vehicle.

Referring to FIG. 3. The client device 304 can be configured to perform the operations, as described herein, necessary to determine the proximity of vehicles near the ego-vehicle. The client device 304 can be configured to transmit the vehicle proximity information to the host device 302. The host device 302 can be configured to perform threat analysis of the vehicles detected by the client device 304 and the host device 302.

Figure 7B:
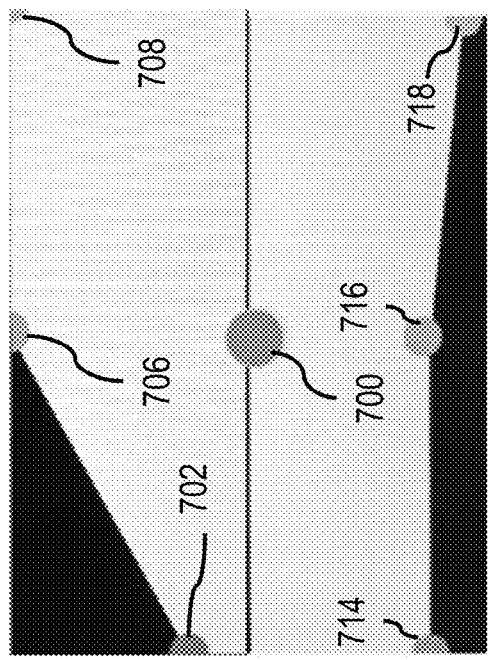
FIG. 7B illustrates a schematic of the locations of the closes vehicles in each lane relative to the ego-vehicle, as determined by a driver assistance system having one or more features consistent with the present description.
Figure 7A:
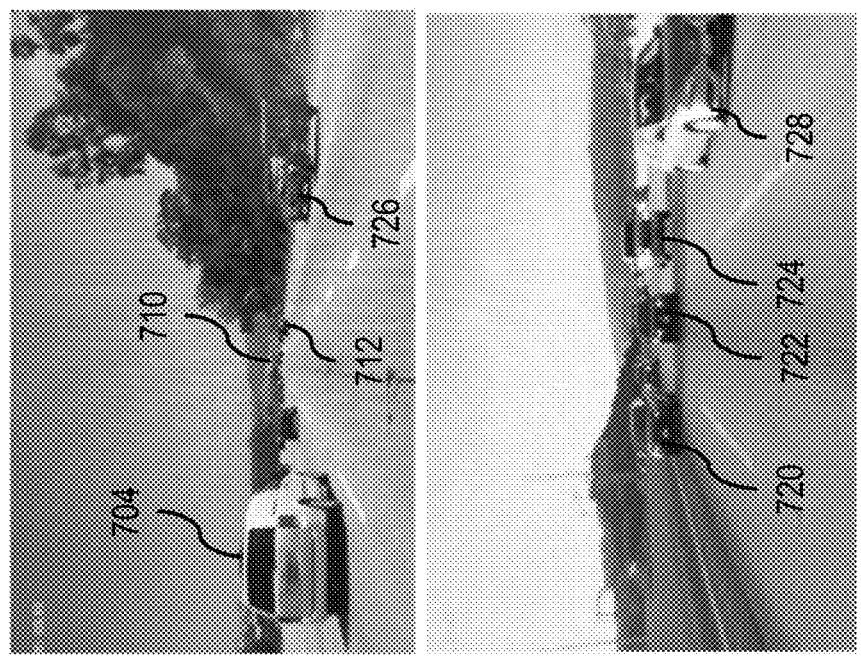
FIG. 7A is an illustration of image data from a forward-facing camera and a rearward-facing camera of a driver assistance system having one or more features consistent with the present description.

FIG. 7A is an illustration of image data from a forward-facing camera and a rearward-facing camera of a driver assistance system having one or more features consistent with the present description. FIG. 7B illustrates a schematic of the locations of the closes vehicles in each lane relative to the ego-vehicle, as determined by a driver assistance system having one or more features consistent with the present description.

In FIG. 7B, circle 700 represents the ego-vehicle. The circles above the circle 700 are representative of the vehicles in front of the ego-vehicle and the circles below the circle 700 are representative of the vehicles behind the ego-vehicle. The circle 702 is representative of vehicle 704 which is the closest vehicle to the ego-vehicle. Circles 706 and 708 are representative of vehicles 710 and 712, respectively. Circles 714, 716 and 718 are representative of vehicles 720, 722 and 724, respectively, that are located behind the ego-vehicle.

In the scenario illustrated in FIGS. 7A and 7B, vehicle 726 is two lanes over from the ego-vehicle and is deemed non-threatening. Similarly, vehicle 728 appears to be moving into the next lane over so that it too will be two lanes over and be deemed non-threatening. Consequently, a driver assistance system, such as driver assistance system 100 illustrated in FIG. 1, may be configured to ignore such vehicles. In other variations, the driver assistance system 100 may analyze the location and patterns of the vehicles in lanes other than the ego-lane and the lanes adjacent the ego-lane. For example, the lane location look-up table can be extended to other lanes and the camera calibration information can be used to determine the location of the other lanes.

Referring to FIG. 3, the host device 302 can be configured to perform ego-vehicle motion analysis 316. Ego-vehicle motion analysis 316 can include an analysis of the operations of the ego-vehicle. For example, the operations of the ego-vehicle can include whether the driver has indicated that they are about to change lanes, whether the ego-vehicle is getting too close to another vehicle, whether the ego-vehicle is drifting across lanes without signaling and/or meaningfully turning, or the like.

The driver assistance system 300 can be configured to generate one or more warning alerts 310. The warning alerts 310 can be one or more of haptic, visual, audible, or the like. The driver assistance system 300 can cause a vibration to be felt by the driver of the vehicle in response to a determination of a threat. The vibration can be provided through the seat and/or steering wheel of the ego-vehicle. In other variations, a vibration can be provided through a connected smartphone or wearable device. The driver assistance system 300 can be configured to display an alert on a display device. For example, an image of the road a head can be presented on the display device when the driver assistance system 300 detects a threat to the ego-vehicle. An indicator of which vehicle in the image data can be provided. For example, the vehicle detected as the threat can be bounded by a box, have an arrow point to it, or the like. The driver assistance system 300 can be configured to sound an alert in response to detecting a threat to the ego-vehicle. An audible alert can include an alarm, a pre-record or synthesized warning message, or the like.

Figure 8:
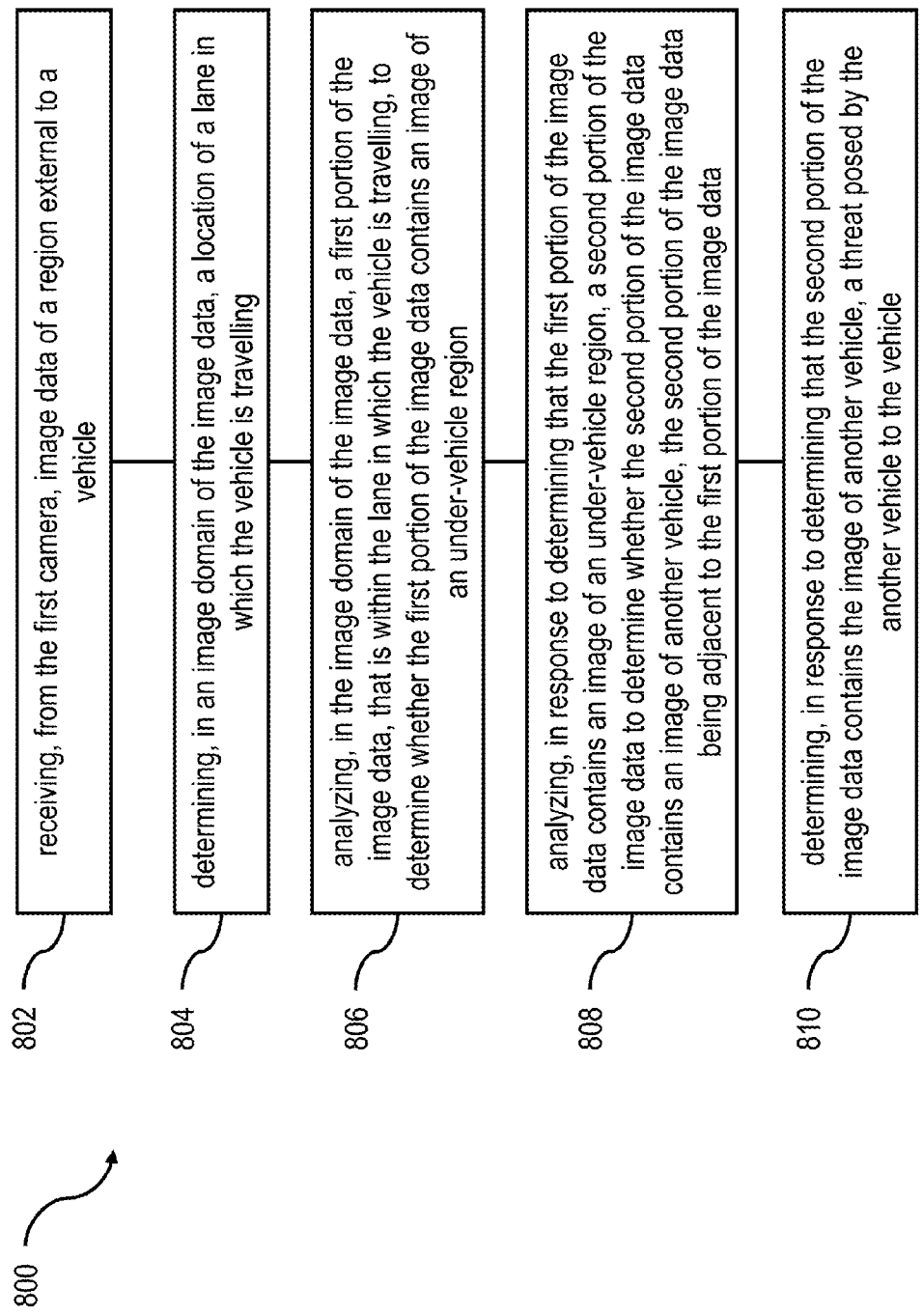
FIG. 8 illustrates a method having one or more features consistent with the present description.

FIG. 8 illustrates a method 800 having one or more features consistent with the present description. The operations of method 800 presented below are intended to be illustrative. In some embodiments, method 800 may be accomplished with one or more additional operations not described, and/or without one or more of the operations discussed. Additionally, the order in which the operations of method 800 are illustrated in FIG. 8 and described below is not intended to be limiting.

In some embodiments, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

At 802, image data of a region external to a vehicle can be received from the first camera. In some variations, image data of another region external to the vehicle can be received by a second camera. The first and second cameras can be part of individual devices. One device can be a forward-facing device with a forward-facing camera and another device can be a rearward-facing device with a rearward-facing camera. FIG. 1 illustrates an example of a driver assistance system 100 having a forward-facing device 102 and a rearward-facing device 104. The image data obtained by the cameras of the individual devices can be processed individually by embedded processors in each device. The processing of the image data can reveal the existence of other vehicles in the vicinity of the vehicle with the driver assistance system and the distance of those other vehicles from the vehicle to determine whether they pose a threat.

At 804, a location of a lane in which the vehicle is travelling can be determined in an image domain of the image data. The location of the lane can be determined using one or more lane detection techniques as described herein. The location of the lane can be determined based on a detection of the boundaries of a lane. The boundaries of a lane can be determined based on detecting the presence of lane line markings.

At 806, a first portion of the image data can be analyzed in the image domain of the image data. The first portion can be within the lane in which the vehicle is travelling. The analysis can be to determine whether the first portion of the image data contains an image of an under-vehicle region.

Analyzing of the first portion of the image can include generating, in the image domain of the image data, a region of interest, the region of interest being within the lane in which the vehicle is travelling. In some variations, multiple regions of interest can be determined. Other regions of interest can be associated with the lanes adjacent to the lane in which the vehicle is travelling in. The location of other regions of interest can be determined by accessing a look-up table to obtain a lane offset value. The lane offset value can be based on calibration information associated with the camera that obtained the image data. The location of the adjacent lanes can be determined in the image domain and regions of interest can be associated with the location of the adjacent lanes.

The region(s) of interest can be divided into a set of discrete blocks. The set of discrete blocks can be individually analyzed one after the other starting with the block closest to the host vehicle. The set of discrete blocks can be analyzed to determine whether a block of the set of discrete blocks contains the image of the under-vehicle shadow.

At 808, in response to determining that the first portion of the image data contains an image of an under-vehicle region, a second portion of the image data can be analyzed to determine whether the second portion of the image data contains an image of the remaining part of the another vehicle, the remaining portion of the image data being above the first portion of the image data.

Analyzing the second portion of the image data can include bounding, in response to determining that the block of the set of discrete blocks contains the image of the under-vehicle region, a portion of the image data adjacent to the block of the set of discrete blocks. The bounded portion of the image data can be analyzed to determine whether the bounded portion of the image data contains the image of the another vehicle.

At 810, in response to determining that the second portion of the image data contains the image of another vehicle, a threat posed by the another vehicle to the vehicle can be determined. Determining whether another vehicle causes a threat to the host vehicle can include determining, based on a location in the image domain of the image data of the bounded portion of the image data, a distance between the vehicle and the another vehicle.

In some variations, motion information associated with the host vehicle can be obtained. A motion of other vehicles detected in the image data, relative to the host vehicle, can be determined.

In some variations, an alert can be generated to inform the driver of the host vehicle that there is another vehicle that poses a threat to the host vehicle. Alerts can be haptic, audible, visual, or the like.

As noted, the disclosed system employs the two-camera setup to provide the driver with more comprehensive assistance by analyzing the threat due the vehicles in front and rear of the ego-vehicle. In addition to the conventional driver assistance operations (e.g., lane departure warning and ego-lane collision avoidance), disclosed system also assists the driver by informing about the threat posed by the vehicles in the adjacent lanes. This can be useful when the driver is either unintentionally drifting into adjacent lanes or wants to make a lane change maneuver in an adjacent lane.

Various implementations of the subject matter described herein may be realized in digital electronic circuitry, integrated circuitry, specially designed ASICs (application specific integrated circuits), computer hardware, firmware, software, and/or combinations thereof. The circuitry may be affixed to a printed circuit board (PCB), or the like, and may take a variety of forms, as noted. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, audible feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. Other implementations may be within the scope of the following claims.

What is claimed:

1. A system comprising:
   a first device comprising:
      at least one forward-facing camera configured to at least obtain image data of a first plurality of regions external to a front of a host vehicle;
   a second device comprising:
      at least one rearward-facing camera configured to obtain image data of a second plurality of regions external to a rear of the host vehicle;
      the second device is configured to perform image analysis on the image data obtained by the rearward-facing camera and determine a threat to the host vehicle by another vehicle in at least one region in the second plurality of regions; and
      transmit determined threat data from the second device to the first device;
   at least one processor embedded in the first device; and
   at least one memory configured to at least store computer-readable instructions, which, when processed by the at least one processor, cause the at least one processor to perform one or more operations, the one or more operations comprising:
      receiving, from the at least one forward-facing camera, the image data of the first plurality of regions and the second plurality of regions and determining at least one region external to the host vehicle having a likelihood of including another vehicle;
      receiving a motion information associated with the host vehicle;
      determining, in an image domain of the image data associated with the at least one determined region, a location of a lane in which the host vehicle is travelling;
      analyzing a first portion of the image data associated with the at least one determined region that is within the lane in which the host vehicle is travelling, the analyzing of the first portion to determine whether the first portion of the image data associated with the at least one determined region contains an image of an under-vehicle region, the analyzing including executing a machine learning analysis of one or more grey color levels of the first portion in relation to one or more grey color level of a road surface of the lane in which the host vehicle is travelling using historical values of grey color levels associated with one or more road surfaces and one or more vehicles;
      analyzing, in response to determining that the first portion of the image data associated with the at least one determined region contains the image of the under-vehicle region, a second portion of the image data to determine whether the second portion of the image data associated with the at least one determined region contains an image of another vehicle, the second portion of the image data being adjacent to the first portion of the image data associated with the at least one determined region; and
      determining, in response to determining that the second portion of the image data associated with the at least one determined region contains the image of another vehicle, the received threat data from the second device, and the received motion information associated with the host vehicle, a threat posed by the another vehicle to the host vehicle.

2. The system of claim 1, wherein the analyzing of the first portion of the image data comprises:
   generating, in the image domain of the image data, a region of interest, the region of interest being within the lane in which the host vehicle is travelling;
   dividing the region of interest into a set of discrete blocks; and
   analyzing the set of discrete blocks to determine whether a block of the set of discrete blocks contains the image of the under-vehicle region.

3. The system of claim 2, wherein the analyzing of the second portion of the image comprises:
   bounding, in response to determining that the block of the set of discrete blocks contains the image of the under-vehicle region, a portion of the image data adjacent to the block of the set of discrete blocks; and
   analyzing the bounded portion of the image data to determine whether the bounded portion of the image data contains the image of the another vehicle.

4. The system of claim 3, wherein the determining of the threat posed by the another vehicle to the host vehicle, comprises:
   determining, based on a location in the image domain of the image data of the bounded portion of the image data, a distance between the host vehicle and the another vehicle.

5. The system of claim 1, wherein the determining of the threat posed by the another vehicle to the host vehicle, comprises:
   determining, based on the motion information associated with the host vehicle, a motion of the another vehicle relative to the host vehicle.

6. The system of claim 1, wherein the operations further comprise:
   generating an alert to a driver of the host vehicle in response to the determining that the threat posed by the another vehicle is above a threshold threat value.

7. The system of claim 1, wherein analyzing the first portion of the image data to determine whether the first portion of the image data contains the image of the under-vehicle region includes at least applying a probabilistic distribution curve providing an indication of a likelihood that the first portion of the image data contains the image of the under-vehicle region.

8. The system of claim 1, wherein the operations further comprise:
   generating a second region of interest associated with an adjacent lane to the lane in which the host vehicle is travelling, the second region of interest generated based on a lane offset value and calibration information associated with forward-facing camera.

9. The system of claim 1, wherein the second portion of the image data is above the first portion of the image data.

10. A method comprising:
    receiving, from at least one forward-facing camera, an image data of a first plurality of regions and a second plurality of regions and determining at least one region external to a front of a host vehicle having a likelihood of including another vehicle;
    receiving a motion information associated with the host vehicle;
    determining, in an image domain of the image data associated with the at least one determined region, a location of a lane in which the host vehicle is travelling;
    analyzing a first portion of the image data associated with the at least one determined region that is within the lane in which the host vehicle is travelling, the analyzing of the first portion to determine whether the first portion of the image data associated with the at least one determined region contains an image of an under-vehicle region, the analyzing including executing a machine learning analysis of one or more grey color levels of the first portion in relation to one or more grey color level of a road surface of the lane in which the host vehicle is travelling using historical values of grey color levels associated with one or more road surfaces and one or more vehicles;

analyzing, in response to determining that the first portion of the image data associated with the at least one determined region contains the image of the under-vehicle region, a second portion of the image data to determine whether the second portion of the image data associated with the at least one determined region contains an image of another vehicle, the second portion of the image data being adjacent to the first portion of the image data associated with the at least one determined region;

obtaining image data of another region external to a rear of the host vehicle at least one rearward-facing camera;

performing image analysis on the image data obtained by the rearward-facing camera and determining a threat to the host vehicle by another vehicle in at least one region in the second plurality of regions;

receiving the determined threat data; and determining, in response to determining that the second portion of the image data associated with the at least one determined region contains the image of another vehicle, the received threat data from the second device, and the received motion information associated with the host vehicle, a threat posed by the another vehicle to the host vehicle.

11. The method of claim 10, wherein the analyzing of the first portion of the image data comprises:
generating, in the image domain of the image data, a region of interest, the region of interest being within the lane in which the host vehicle is travelling;
dividing the region of interest into a set of discrete blocks; and
analyzing the set of discrete blocks to determine whether a block of the set of discrete blocks contains the image of the under-vehicle region.

12. The method of claim 11, wherein the analyzing of the second portion of the image comprises:
bounding, in response to determining that the block of the set of discrete blocks contains the image of the under-vehicle region, a portion of the image data adjacent to the block of the set of discrete blocks; and
analyzing the bounded portion of the image data to determine whether the bounded portion of the image data contains the image of the another vehicle.

13. The method of claim 12, wherein the determining of the threat posed by the another vehicle to the host vehicle, comprises:
determining, based on a location in the image domain of the image data of the bounded portion of the image data, a distance between the host vehicle and the another vehicle.

14. The method of claim 10, wherein the determining of the threat posed by the another vehicle to the host vehicle, comprises:
determining, based on the motion information associated with the host vehicle, a motion of the another vehicle relative to the host vehicle.

15. The method of claim 10, further comprising:
generating an alert to a driver of the host vehicle in response to the determining that the threat posed by the another vehicle is above a threshold threat value.

16. The method of claim 10, wherein analyzing the first portion of the image data to determine whether the first portion of the image data contains the image of the under-vehicle region includes at least applying a probabilistic distribution curve providing an indication of a likelihood that the first portion of the image data contains the image of the under-vehicle region.

17. The method of claim 10, further comprising:
generating a second region of interest associated with an adjacent lane to the lane in which the host vehicle is travelling, the second region of interest generated based on a lane offset value and calibration information associated with forward-facing camera.

18. The method of claim 10, wherein the second portion of the image data is above the first portion of the image data.

19. A non-transient computer readable medium containing program instructions which, when executed by at least one processor, cause the at least one processor to perform one or more operations, the operations comprising:
receiving, from at least one forward-facing camera, an image data of a first plurality of regions and a second plurality of regions and determining at least one region external to a front of a host vehicle having a likelihood of including another vehicle;

receiving a motion information associated with the host vehicle;

determining, in an image domain of the image data associated with the at least one determined region, a location of a lane in which the host vehicle is travelling;

analyzing a first portion of the image data associated with the at least one determined region that is within the lane in which the host vehicle is travelling, the analyzing of the first portion to determine whether the first portion of the image data associated with the at least one determined region contains an image of an under-vehicle region, the analyzing including executing a machine learning analysis of one or more grey color levels of the first portion in relation to one or more grey color level of a road surface of the lane in which the host vehicle is travelling using historical values of grey color levels associated with one or more road surfaces and one or more vehicles;

analyzing, in response to determining that the first portion of the image data associated with the at least one determined region contains the image of the under-vehicle region, a second portion of the image data to determine whether the second portion of the image data associated with the at least one determined region contains an image of another vehicle, the second portion of the image data being adjacent to the first portion of the image data associated with the at least one determined region;

obtaining image data of another region external to a rear of the host vehicle at least one rearward-facing camera;

performing image analysis on the image data obtained by the rearward-facing camera and determining a threat to the host vehicle by another vehicle in at least one region in the second plurality of regions;

receiving the determined threat data; and determining, in response to determining that the second portion of the image data associated with the at least one determined region contains the image of another vehicle, and the received threat data from the second device, and the received motion information associated with the host vehicle, a threat posed by the another vehicle to the host vehicle.

20. A system comprising:

at least one processor configured to receive an image data of a first plurality of regions and a second plurality of regions and determining at least one region external to a front of a host vehicle having a likelihood of including another vehicle from at least one forward-facing camera;

at least one processor configured to receive a motion information associated with the host vehicle;

at least one processor configured to determine, in an image domain of the image data associated with the at least one determined region, a location of a lane in which the host vehicle is travelling;

at least one processor configured to analyze a first portion of the image data associated with the at least one determined region that is within the lane in which the host vehicle is travelling, the analyzing of the first portion to determine whether the first portion of the image data associated with the at least one determined region contains an image of an under-vehicle region, the analyzing including executing a machine learning analysis of one or more grey color levels of the first portion in relation to one or more grey color level of a road surface of the lane in which the host vehicle is travelling using historical values of grey color levels associated with one or more road surfaces and one or more vehicles;

at least one processor configured to analyze, in response to determining that the first portion of the image data associated with the at least one determined region contains the image of the under-vehicle region, a second portion of the image data to determine whether the second portion of the image data associated with the at least one determined region contains an image of another vehicle, the second portion of the image data being adjacent to the first portion of the image data associated with the at least one determined region;

at least one processor configured to obtain image data of another region external to a rear of the host vehicle at least one rearward-facing camera;

at least one processor configured to perform image analysis on the image data obtained by the rearward-facing camera and determining a threat to the host vehicle by another vehicle in at least one region in the second plurality of regions;

at least one processor configured to receive the determined threat data; and at least one processor configured to determine, in response to determining that the second portion of the image data associated with the at least one determined region contains the image of another vehicle, the received threat data from the second device, and the received motion information associated with the host vehicle, a threat posed by the another vehicle to the host vehicle.

* * * * *